M. TROYANOSKI.
WINDMILL.
APPLICATION FILED AUG. 21, 1916.
1,249,859.
Patented Dec. 11, 1917.
2 SHEETS—SHEET 1.
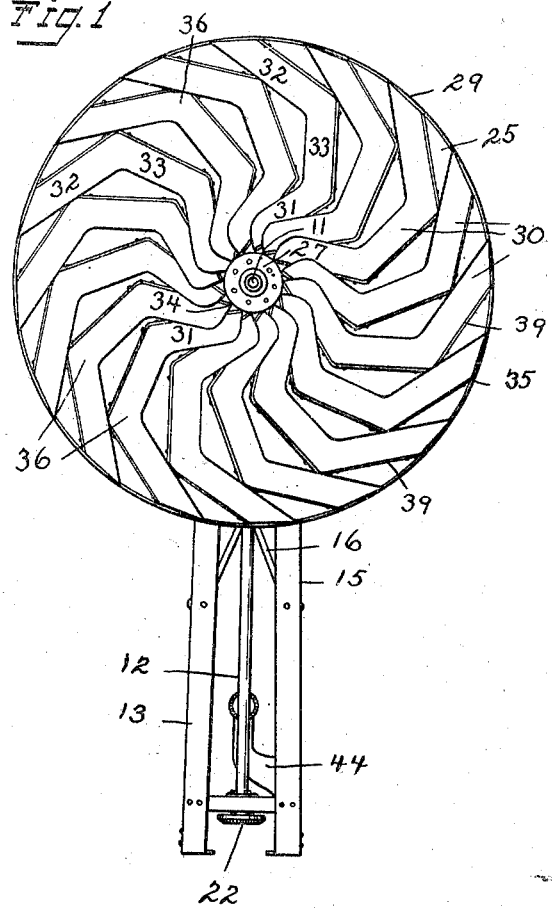
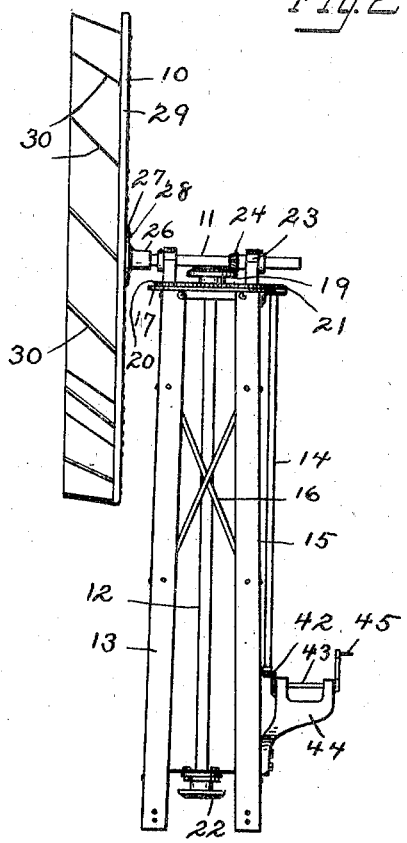
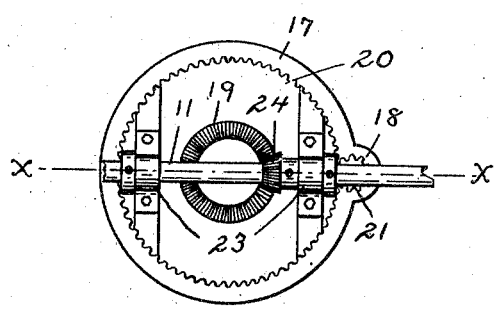
Inventor:
Maryan Troyanoski.
By Louis M. Schmidt
Atty.

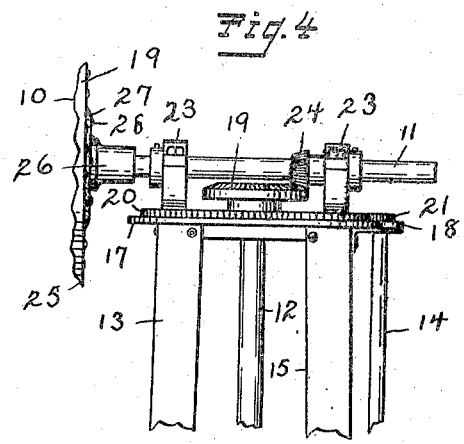
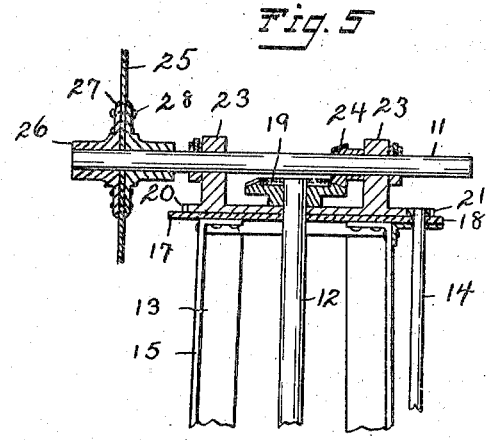
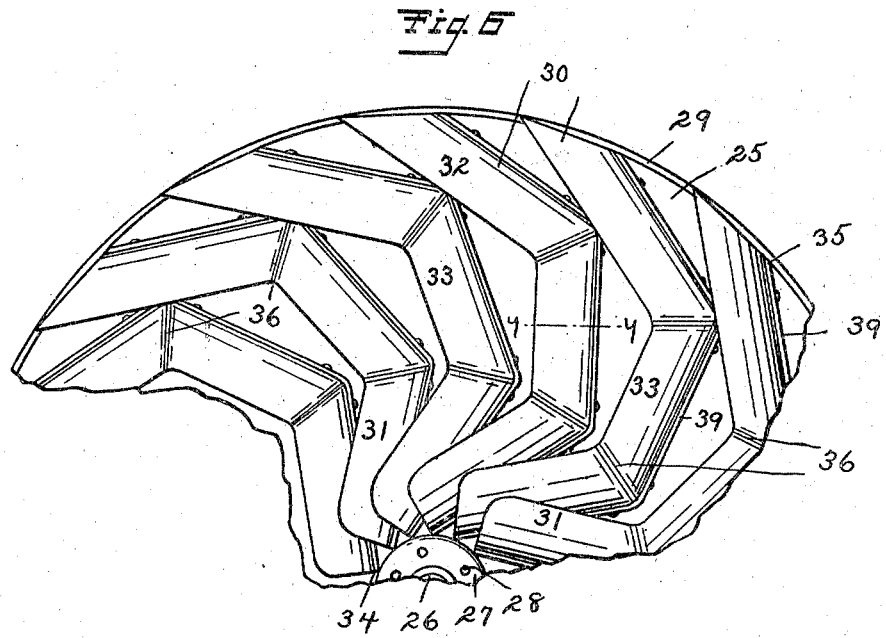
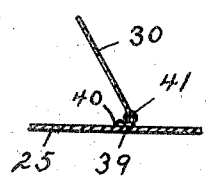

UNITED STATES PATENT OFFICE.

MARYAN TROYANOSKI, OF NEW BRITAIN, CONNECTICUT, ASSIGNOR OF ONE-HALF TO FRANK KRUPA, OF NEW BRITAIN, CONNECTICUT.

WINDMILL.

1,249,859.  Specification of Letters Patent.  Patented Dec. 11, 1917.

Application filed August 21, 1916. Serial No. 116,053.

*To all whom it may concern:*

Be it known that I, MARYAN TROYANOSKI, a citizen of Russia, residing at New Britain, in the county of Hartford and State of Connecticut, have invented certain new and useful Improvements in Windmills, of which the following is a specification.

My invention relates to improvements in windmills, and the object of my improvement is simplicity and economy in construction and convenience and efficiency in use.

In the accompanying drawing:—

Figure 1 is a front elevation of part of a windmill structure embodying my invention.

Fig. 2 is a side elevation of the same.

Fig. 3 is a plan view, on an enlarged scale, of part of the same.

Fig. 4 is a side elevation of the same.

Fig. 5 is a sectional view on the line $x\ x$ of Fig. 3.

Fig. 6 is a fragmentary front elevation of a portion of the windmill.

Fig. 7 is a sectional view on the line $y\ y$ of Fig. 6.

My improved windmill comprises the windmill proper 10 positioned in a vertical plane, mounted by its center on the horizontal shaft 11, and operatively connected to the vertical power shaft 12, the latter being supported in the head or frame 13, and means for bodily shifting the position of the windmill 10 so as to adjust the same for the purpose of changing the wind effect, operated through the medium of the vertical adjusting shaft 14.

The frame 13 is of skeleton construction, of square cross-section, having at the corners angle bars 15, which are cross-connected by tie pieces 16, and having at the top a top-plate 17 of circular form generally and provided with a laterally extending ear 18. The plate 17 has a hole at the center of the circular or body portion for the power shaft 12 and there is a hole at the junction of the said body portion and the ear 18 for the adjusting shaft 14.

The power shaft 12 extends upwardly through the top-plate 17, has mounted on the extreme upper end a bevel gear 19, and between the said bevel gear 19 and the top-plate 17 and resting on the latter is a plate-gear 20.

The adjusting shaft 14 extends through the plate 17 and has mounted on the upper end a pinion 21, resting on the plate 17 and accordingly in the same plane as the plate-gear 20, and which coöperates with the teeth in the periphery of the said plate-gear 20.

At the lower end of the power shaft 12 is mounted a gear 22 that serves as the means for connecting to the work.

Mounted on the upper side of the gear plate 20 is a pair of bearings 23 for the windmill shaft 11, in spaced relation, one on each side of the center, and of sufficient height to support a bevel gear or pinion 24, mounted on the said windmill shaft 11, so as to coöperate with the bevel gear 19 on the power shaft 12.

The windmill 10 is of special construction, comprising a circular back plate 25, mounted on the windmill shaft 11 by means of a pair of hubs 26, one on each side, and having each a flange 27 of circular form bearing against the plate 25, and secured by bolts 28 that pass through the said flanges 27 and the plate 25 interposed therebetween. The periphery of the plate 25 is bounded by an angle strip 29, bent into circular form. On the outer face of the plate 25 is mounted a set of blades or vanes 30 of special form, extending from the flange 27 of the outer hub 26 to the peripheral angle strip 29.

The blades 30 are of sheet material of appreciable depth, and are bent so as to form three sections of equal length, comprising in each case the inside section 31, the outside section 32, and the intermediate connecting section 33. The innermost end 34 of the base of the vane, adjacent the flange 27, and the outermost end 35, are in line with a radius, and the intermediate section 33 is parallel to the same radius, and the length of the vanes 30 is such that the said intermediate section 33 will in each case be appreciably off-set relatively to the said radius, due to the bends 36 at the junctions of the adjacent sections, as shown.

As described, the vanes 30 have a generally bowed form, and the inclination of the said vanes 30 relatively to the back plate 25 is in the same general direction as the bends 36 relatively to the intermediate section 33, wherefore the structure of the said vanes 30 is such as to coöperate with the back plate 25 to form a bucket suitable to receive a power impulse effectively from wind from substantially any direction between extremes that would be determined generally by the direction of the plane of the back plate 25 on one side and the plane of the inclination of the vanes 30 relatively to the said back plate 25 on the other side.

As a support for the vanes 30 I provide an angle strip 39, the inner flange 40 of which is secured to the back plate 25 and the outer flange 41 of which is secured to the vane 30, at the lower edge portion thereof. The two flanges 40 and 41 are disposed at a right angle, and the body portion of the vane 30 is bent relatively to the said lower edge portion suitably to provide for the proper inclination relatively to the back plate 25, as shown in Fig. 7.

By shifting the windmill 10 bodily the same may be brought to a position for effective operation between the limits mentioned, and to reduce the power obtained for a given direction of the wind the windmill may be turned relatively to the wind to one side or the other of the limits described. To effect such turning of the windmill 10 the adjusting shaft 14 is turned to obtain the adjustment desired.

On the lower end of the said adjusting shaft 14 is a gear 42 which serves as a means for connecting with a hand operated device for effecting the desired adjustment, such as the shaft 43 supported from the frame 13 by means of the bracket 44 and provided with the crank 45.

I find that a windmill of the particular structure shown and described is efficient in operation and the construction is simple and substantial, such as is adapted to withstand hard usage.

I claim as my invention:—

1. A windmill comprising a circular back plate, a hub structure connected to the center of the said plate, and vanes mounted on one face of the said plate in a generally radial position, the said vanes being formed of sheet material, having a bowed form of structure formed by a plurality of bends of the said material, and being inclined at an appreciable angle relatively to the said back plate.

2. A windmill comprising a circular back plate, a hub structure connected to the center of the said plate, and vanes mounted on one face of the said plate in a generally radial position, the said vanes being formed of sheet material, having a bowed form of structure formed by a plurality of bends of the said material, and being inclined at an appreciable angle relatively to the said back plate, the said vanes extending from adjacent the middle of the said back plate to the periphery, and the said sections being of equal length.

MARYAN TROYANOSKI.

Witnesses:
JADWIGOE KREYRA,
HENRY P. ROCHE.

Copies of this patent may be obtained for five cents each, by addressing the "Commissioner of Patents, Washington, D. C."